United States Patent
Blunk et al.

(10) Patent No.: US 9,105,884 B2
(45) Date of Patent: Aug. 11, 2015

(54) METHOD OF CONTROLLING THICKNESS OF FORM-IN-PLACE SEALING FOR PEM FUEL CELL STACKS

(71) Applicant: GM Global Technology Operations LLC, Detroit, MI (US)

(72) Inventors: Richard H. Blunk, Macomb Township, MI (US); Andrew P. Nowak, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 14/336,485

(22) Filed: Jul. 21, 2014

(65) Prior Publication Data

US 2014/0329166 A1    Nov. 6, 2014

Related U.S. Application Data

(62) Division of application No. 13/295,665, filed on Nov. 14, 2011, now Pat. No. 8,822,100.

(51) Int. Cl.
*H01M 8/02* (2006.01)
*F16J 15/14* (2006.01)
*H01M 8/10* (2006.01)

(52) U.S. Cl.
CPC .............. *H01M 8/0276* (2013.01); *F16J 15/14* (2013.01); *H01M 8/0284* (2013.01); *H01M 8/0286* (2013.01); *H01M 2008/1095* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 4,196,162 A | 4/1980 | Stichter | |
| 5,484,666 A | 1/1996 | Gibb et al. | |
| 5,789,091 A | 8/1998 | Wozniczka et al. | |
| 6,040,072 A | 3/2000 | Murphy et al. | |
| 7,807,316 B2 | 10/2010 | Andreas-Schott et al. | |
| 2004/0137307 A1* | 7/2004 | Okonogi et al. | 429/37 |
| 2005/0255372 A1* | 11/2005 | Lertola | 429/44 |
| 2006/0040166 A1 | 2/2006 | Budinski et al. | |
| 2008/0145713 A1 | 6/2008 | Connor | |
| 2009/0291344 A1* | 11/2009 | Tanaka et al. | 429/30 |
| 2011/0217617 A1 | 9/2011 | Andreas-Schott et al. | |

FOREIGN PATENT DOCUMENTS

| | | |
|---|---|---|
| DE | 102007051568 A1 | 5/2008 |
| DE | 602005006196 T2 | 7/2009 |
| EP | 1619426 A1 | 1/2006 |

* cited by examiner

*Primary Examiner* — Patrick Ryan
*Assistant Examiner* — Wyatt McConnell
(74) *Attorney, Agent, or Firm* — Fraser Clemens Martin & Miller LLC; James D. Miller

(57) ABSTRACT

A sealed assembly is made using sealant including a deformable spacer to control thickness without adversely impacting elasticity and sealing force. Deformable spacers (e.g., elastomer, polyolefin, etc.) are mixed with an elastomeric precursor material and dispensed onto an assembly component, such as a fuel cell bipolar plate, and the remaining component(s) are assembled by pressing against the deformable spacer to ensure a defined seal thickness. The precursor is cured to form a seal that is further compressed to provide an effective sealing force. The deformable spacers control the thickness of a sealed area and allow use of form-in-place sealing processes.

18 Claims, 3 Drawing Sheets

METHOD OF CONTROLLING THICKNESS OF FORM-IN-PLACE SEALING FOR PEM FUEL CELL STACKS

CROSS-REFERENCE TO RELATED APPLICATION

This application is a divisional application of U.S. patent application Ser. No. 13/295,665 filed on Nov. 14, 2011. The entire disclosure is hereby incorporated herein by reference in its entirety.

FIELD OF THE INVENTION

The present technology relates to sealing components in an assembly, such as a fuel cell, and controlling a thickness of the seal.

BACKGROUND OF THE INVENTION

This section provides background information related to the present disclosure which is not necessarily prior art.

Hydrogen is an attractive fuel as it can provide low emissions and can be used to efficiently produce electricity in a fuel cell. A hydrogen fuel cell is an electrochemical device having an anode and a cathode separated by an electrolyte. The anode receives a fuel such as hydrogen gas and the cathode receives an oxidant such as oxygen or air. Hydrogen gas is dissociated in the anode to generate free protons and electrons, where the protons pass through the electrolyte to the cathode. The electrons from the anode do not pass through the electrolyte, but are instead directed through a load to perform work before being directed to the cathode. In the cathode, the protons, electrons, and oxygen react and generate water.

Proton exchange membrane (PEM) fuel cells are a type of fuel cell used to power vehicles. The PEM fuel cell generally includes a solid polymer-electrolyte proton-conducting membrane, such as a perfluorosulfonic acid membrane. The anode and cathode can include a catalytic mixture of finely divided catalytic particles, such as platinum (Pt), supported on carbon particles and mixed with an ionomer. The catalytic mixture can be deposited on opposing sides of the membrane. Combination of the anode catalytic mixture, the cathode catalytic mixture, and the membrane can be referred to as a membrane electrode assembly (MEA).

Several fuel cells can be combined into one or more fuel cell stacks to generate the desired power. For certain applications, a fuel cell stack may include several hundred or more fuel cells. The fuel cell stack receives a cathode reactant gas, which can be a flow of air forced through the stack by a compressor. The fuel cell stack also receives an anode reactant gas such as hydrogen that flows into the anode side of the stack.

A fuel cell stack can include a series of bipolar plates positioned between several MEAs within the stack, where the bipolar plates and the MEAs are positioned between two end plates. The bipolar plates include an anode side and a cathode side for adjacent fuel cells in the stack. Anode gas flow channels are provided on the anode side of the bipolar plates to allow the anode reactant gas to flow to the respective MEA. Cathode gas flow channels are provided on the cathode side of the bipolar plates to allow the cathode reactant gas to flow to the respective MEA. One end plate includes anode gas flow channels and the other end plate includes cathode gas flow channels. The bipolar plates and end plates are made of a conductive material such as stainless steel or a conductive composite. The end plates conduct the electricity generated by the fuel cells out of the stack. The bipolar plates can also include coolant flow channels, through which a cooling fluid flows to control the temperature of the fuel cell.

Reactant gas stream passages can be sealed to prevent leaks and intermixing of fuel and oxidant fluid streams. Fuel cell stacks can employ resilient seals or gaskets between stack components to provide effective sealing. Such seals can also isolate manifolds and electrochemically active areas of the fuel cell MEAs by circumscribing these areas. For example, a fluid tight seal can be achieved by a resilient gasket formed of an elastomeric material interposed between the flow field plates and the membrane to which a compressive force is applied. A fuel cell stack having multiple plates can therefore be equipped with multiple gaskets and a suitable compression system for applying a compressive force to the gaskets.

Sealing around plate manifold openings and MEAs within fuel cells can include framing the MEA with a fluid-impermeable and resilient gasket, placing preformed gaskets in channels in the electrode layers and/or separator plates, or molding seals within grooves in the electrode layer or separator plate, and circumscribing the electrochemically active area and any fluid manifold openings.

Seals can also be formed using cure-in-place and form-in-place methods. Cure-in-place methods dispense a bead of precursor material, such as silicone elastomer, to provide a seal between two or more components. The cure-in-place process can be used where parts may be disassembled for service. A bead of precursor is dispensed in specifically defined areas of one of the components to be assembled. Once the precursor has cured and is adhered to the component to which it was applied, the component is assembled with the other component(s) and the cured bead is compressed. The compression and the cohesion of the cured material provides the sealing. However, with cure-in-place sealing it can be difficult to reliably meet tight gasket height tolerances (e.g., 1.050±0.10 mm) for the dispensed bead of precursor. Slow and costly robotic dispensing speeds (e.g., about 60 sec cycle time per plate) are hence used to obtain the desired tolerance.

Form-in-place methods dispense a bead of precursor material, such as a silicone elastomer, during the assembly of two or more stack components. The precursor is dispensed on the surface of one or more components and the components are then assembled while the precursor is still wet and uncured. Once the precursor has cured, elastomeric cohesion provides sealing between the components. This technique can be used where components are assembled immediately on a production line and for parts that do not need to be frequently disassembled. Use of the form-in-place sealing process can relax the dispensed gasket height tolerance about 10-fold (e.g., 2.50±1.0 mm), which in turn reduces the sealing cycle time by half (e.g., about 30 sec cycle time per plate). However, with form-in-place sealing, the metal bipolar plates in a fuel cell may not be stiff and flat enough, making it difficult to control the uncured and wet gasket thickness upon stack assembly.

SUMMARY OF THE INVENTION

The present technology includes systems, processes, articles of manufacture, and compositions that relate to sealing components of an assembly. Form-in-place methods, sealants, and seals include one or more deformable or soft spacers. These deformable spacers can control the thickness of the resulting seal without adversely impacting elasticity and subsequent sealing force.

In various embodiments, a sealed assembly comprises a first component, a second component, a seal, and a compression system. The seal is disposed between the first component and the second component and includes a first resilient material and a deformable spacer. A first dimension of the deformable spacer defines a distance between the first component and the second component. The compression system compresses the seal between the first component and the second component and deforms the deformable spacer.

In various embodiments, a method of sealing an assembly comprising a first component and second component is provided. A sealant is applied to one of the first component and the second component where the sealant comprises a precursor material and a deformable spacer. The sealant is then contacted with the other of the first component and the second component and compressed between the first component and the second component. A first dimension of the deformable spacer defines a distance between the first component and the second component. The sealant is cured to form a seal comprising a first resilient material and the deformable spacer. In some embodiments, the deformable spacer comprises a second resilient material, such as a silicone elastomer. The seal can be further compressed to deform the deformable spacer comprising the second resilient material. In some embodiments, the deformable spacer comprises a thermoplastic material, such as polyethylene. The deformable spacer comprising the thermoplastic material can be heated to soften the thermoplastic material and the seal can be further compressed to deform the deformable spacer comprising the softened thermoplastic material.

The present technology can be applied to fuel cell assemblies, fuel cell stacks, and methods of making fuel cell assemblies and fuel cell stacks. For example, the first component can comprise a member selected from the group consisting of an end plate, a bipolar plate, and a membrane electrode assembly and the second component can comprise a member selected from the group consisting of an end plate and a bipolar plate. A fuel cell stack can comprise a plurality of such fuel cell assemblies.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible.

The present technology includes ways to seal two or more components together, including embodiments where the components are held together by a compressive force. A seal including a resilient material or a sealant that cures to form a resilient material includes a soft or deformable spacer to control thickness of the seal during assembly where the deformable spacer does not adversely impact seal elasticity and sealing capability. Seal thickness and the distance between the sealed components can be important in various applications, for example, where the space between the components provides a functional aspect of the assembly. The deformable spacer can maintain a particular thickness during assembly and can be further compressed to maintain a particular sealing force.

The deformable spacer enables the resilient material to be compressed in order to generate sufficient sealing/counter force depending on the desired application. Some applications may require changes in compression and resiliency of the seal to accommodate expansion and contraction of the sealed assembly, for example, due to changes in pressure and/or temperature. The deformable spacer can possess elastomeric properties for enhanced sealing, for example, and can also comprise materials such as thermoplastic elastomers, thermoset elastomers, and polyolefins. The present seals, sealants, and assemblies are useful in fuel cell applications where certain components are sealed using compression.

Figure 1:
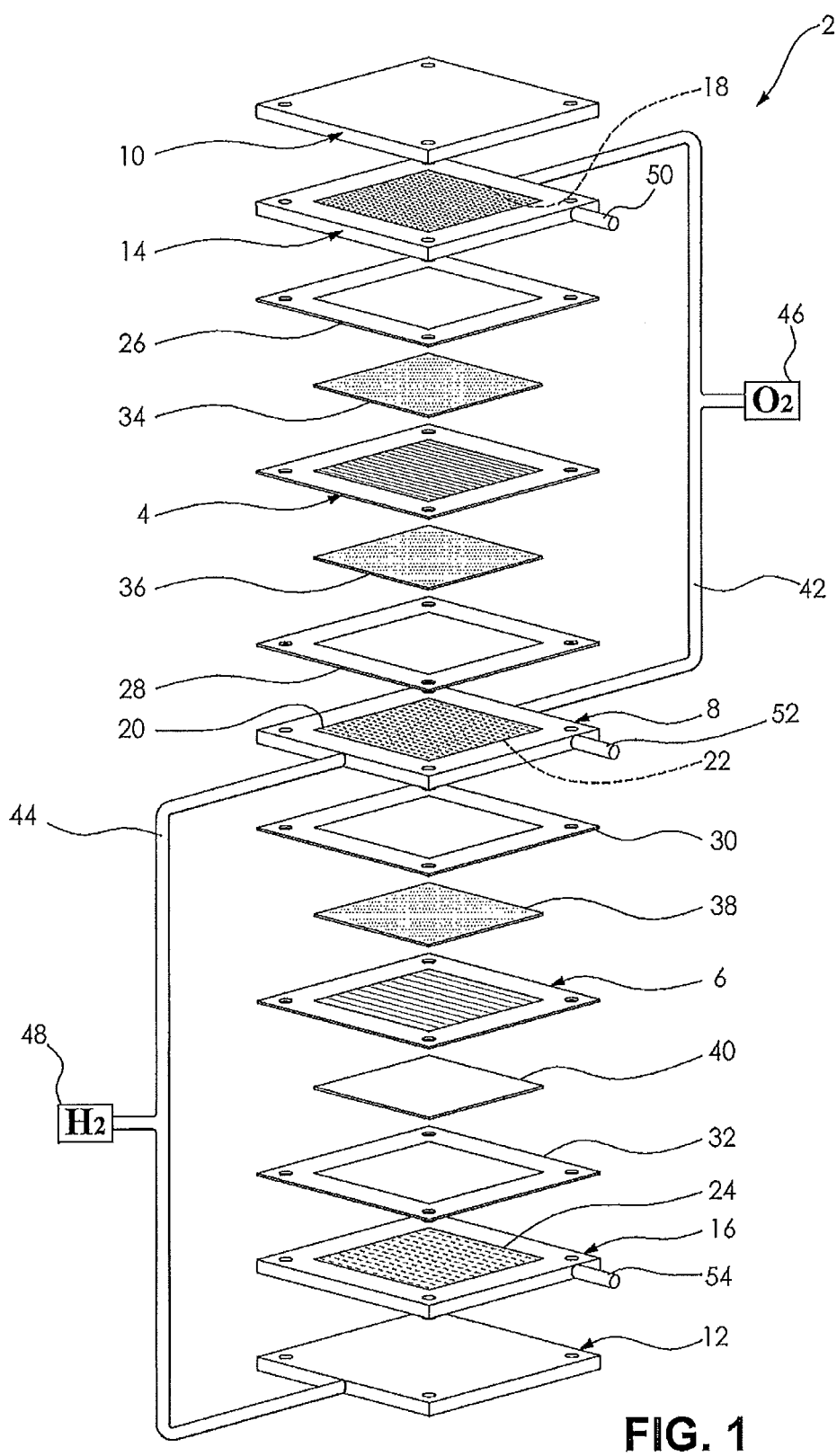
FIG. 1 illustrates a schematic, exploded perspective view of an embodiment of a PEM fuel cell stack (showing only two cells) that depicts the location of seals formed according to the present technology.

FIG. 1 depicts a two cell PEM fuel cell stack 2 having a pair of membrane-electrode-assemblies (MEAs) 4, 6 separated from each other by an electrically conductive fluid distribution element 8, hereinafter a bipolar plate 8. In some embodiments, the PEM fuel cell stack 2 can include a single fuel cell having a single MEA, a pair of fuel cells having two MEAs (as shown in FIG. 1), or more than two fuel cells having more than two MEAs, including tens or hundreds of fuel cells and MEAs. The MEAs 4, 6 and bipolar plate 8, are stacked together between end units 10, 12, and end contact elements or end plates 14, 16. The end plates 14, 16, as well as both working faces of the bipolar plate 8, include a plurality of flow-path grooves or channels 18, 20, 22, 24, respectively, for distributing fuel and oxidant gases (e.g., $H_2$ and $O_2$) to the MEAs 4, 6. Seals 26, 28, 30, 32 effectively seal and electrically insulate between the several components of the fuel cell stack. The seals 26, 28, 30, 32 are shown as separate components from the bipolar plate 8, end plates 14, 16, and MEAs 4, 6 in the exploded view of FIG. 1 for clarity; however, the seals 26, 28, 30, 32 can comprise the various seals as described herein and can be formed using the various methods as described herein. The seals 26, 28, 30, 32 are arranged to prevent fluids from leaking around the edges of the MEAs 4, 6.

The MEAs 4, 6 are disposed adjacent to gas permeable conductive materials known as gas diffusion media (GDM) 34, 36, 38, 40. The GDM 34, 36, 38, 40 can include carbon or graphite diffusion paper. Suitable carbon paper is commercially available from Toray Industries as Toray TGP-H060, for example. The GDM 34, 36, 38, 40 contact the MEAs 4, 6. The end plates 14, 16 contact the GDM 34, 40 respectively. The bipolar plate 8 contacts the GDM 36 on the anode face of MEA 4, configured to accept hydrogen-bearing reactant, and also contacts the GDM 38 on the cathode face of MEA 6, configured to accept oxygen-bearing reactant. Oxygen is supplied to the cathode side of the fuel cell stack 2 from storage tank 46, for example, via an appropriate supply conduit 42. Hydrogen is supplied to the anode side of the fuel cell from a storage tank 48, for example, via an appropriate supply conduit 44. Alternatively, ambient air may be supplied to the cathode side as an oxygen source and hydrogen to the anode from a methanol or gasoline reformer, and the like. Exhaust conduits (not shown in FIG. 1) for both the anode and cathode sides of the MEAs 4, 6 are also provided. Additional conduits 50, 52, and 54 are provided for supplying liquid coolant to the bipolar plate 8 and end plates 14, 16. Appropriate conduits for exhausting coolant from the bipolar plate 8 and end plates 14, 16 are also provided (not shown).

The PEM fuel cell stack 2 includes a compression system (not shown) for compressing components together and maintaining an effective sealing force at the seals 26, 28, 30, 32. Suitable compression systems, also referred to as compression retention systems, include those as described in U.S. Pat. No. 7,807,316 to Andreas-Schott et al., U.S. Pat. No. 6,040,072 to Murphy et al., U.S. Pat. No. 5,789,091 to Wozniczka et al, and U.S. Pat. No. 5,484,666 to Gibb et al., and U.S. Pat. Appl. Pub. Nos. 2011/0217617 to Andreas-Schott et al., 2008/0145713 to Connor et al., and 2006/0040166 to Budinski et al., all of which are incorporated entirely herein by reference. For example, as described in U.S. Pat. Appl. Pub. No. 2011/0217617 to Andreas-Schott et al., a plurality of compliant straps can be disposed adjacent to the PEM fuel cell stack 2. The compression retention system can be adapted to apply a compressive force to the fuel cell stack 2 and to accommodate an expansion of the fuel cell stack 2. The compression retention system can also be adapted to maintain the compressive force within a desired range. It should be appreciated that the expansion of the fuel cell stack 2 can result from the swelling or expansion of one or more MEAs, where the swelling or expansion occurs in response to changes in humidity and/or temperature of the fuel cell stack 2 while in operation. For example, expansion of the fuel cell stack 2 can occur as the temperature of the fuel cell stack 2 rises from about an ambient temperature of 25 degrees C. to an operating temperature of about 80 degrees C.

As shown in FIG. 1, the seals 26, 28, 30, 32 are disposed between various components of the fuel cell stack 2. For example, one component can include an end plate 14, 16, a bipolar plate 8, or a membrane electrode assembly 4, 6, that is sealed with another component including an end plate 14, 16, or a bipolar plate 8. Other components in a fuel cell system can likewise be sealed and various assemblies of various components not limited to fuel cells can be sealed using the present technology.

Figure 2A:
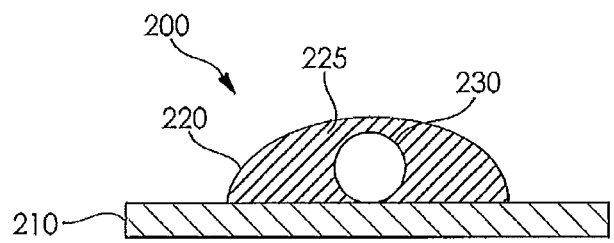
FIGS. 2A-2D illustrate cross-sectional views of an embodiment of a method of sealing an assembly according to the present technology.
Figure 2B:
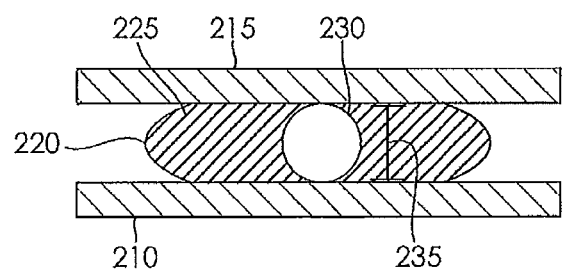
Figure 2C:
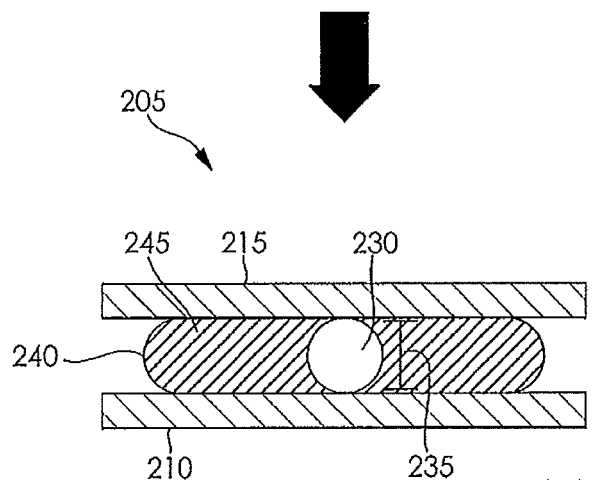
Figure 2D:
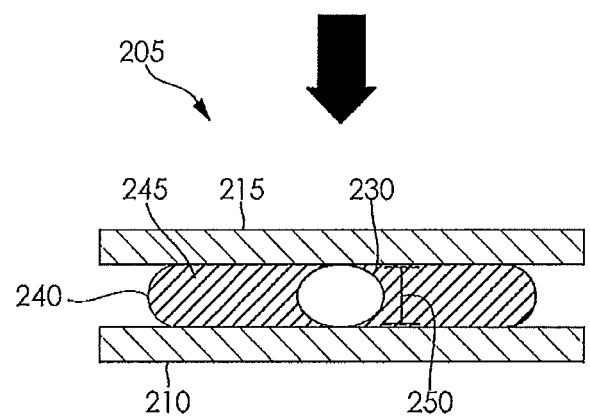

Referring now to FIGS. 2A-2D, an embodiment of a method 200 of sealing an assembly 205 comprising a first component 210 and second component 215 is shown in cross-section. In FIG. 2A, a sealant 220 is applied to first component 210 where the sealant 220 includes a precursor material 225 and a deformable spacer 230. The precursor material 225 is at least partially fluid in that it can flow under pressure, such as when squeezed between the first component 210 and the second component 215. The precursor material 225 can impart the sealant 220 with a consistency ranging from gel-like to paste-like so that the sealant 220 may be dispensed as a bead onto the first component 210. In FIG. 2B, the sealant 220 is placed in contact with the second component 215. The sealant 220 is compressed between the first component 210 and the second component 215 to a point where the deformable spacer 230 contacts the first component 210 and the second component 215. A first dimension 235 of the deformable spacer 230 defines a distance between the first component 210 and the second component 215. For example, the deformable spacer 230 acts as a soft stop in compressing the first component 210 and the second component 215 together to maintain a specified distance defined by the first dimension 235. Changing the shape and size of the deformable spacer 230 can adjust the first dimension 235 as desired. In FIG. 2C, the sealant 220 is cured to form a seal 240 comprising a resilient material 245 and the deformable spacer 230. The cured precursor material 225 forms the resilient material 245. The resulting seal 240 can form one or more of the seals 26, 28, 30, 32 depicted in FIG. 1. In FIG. 2D, the seal 240 is compressed between the first component 210 and the second component 215 thereby deforming the deformable spacer 230 and resulting in a reduced first dimension 250 that is less that the first dimension 235. The compressed seal 240 provides an effective sealing and counter force between the first component 210 and the second component 215. In this way, the seal 240 can prevent the passage of fluids, including reactant gases, water vapor, and liquid water within a fuel cell.

Various deformable spacers 230 can be used. All manner of geometric shapes of deformable spacers 230 can be employed, including spheres, cylinders, cubes, etc. The first dimension 235 of the deformable spacer 230 can be changed to tailor the distance between the first component 210 and the second component 215. In some embodiments, the first dimension 235 is about 0.5 mm to about 2.0 mm. In certain embodiments, the first dimension 235 is about 1.0 mm. In certain embodiments the first dimension 235 can be made larger than the desired spacing between the first component 210 and the second component 215 so that compression of the seal 240 and deformation of the deformable spacer 230 results in a reduced first dimension 250, the reduced first dimension 250 being the final desired spacing for the sealed assembly 205. For example, the first dimension 235 can be greater than about 0.5 mm to about 2.0 mm so that upon compression the deformable spacer 230 has a reduced first dimension 250 of about 0.5 mm to about 2.0 mm, including about 1.0 mm.

The deformable spacer 230 can be made of a resilient material that is capable of returning to its original shape after being compressed. In some embodiments, the deformable spacer 230 can be made from cured precursor material 225 used in the sealant 220. The resulting seal 240 can therefore comprise a resilient material 245 and deformable spacer 230 made of the same material so they have similar if not identical physical properties. The deformable spacer 230 can comprise an elastomer such as a silicone elastomer and can also be made of a thermoplastic material, such as polyethylene, that can be deformed under compression. In some cases, a thermoplastic deformable spacer 230 can be heated so that it is more readily deformed upon compression.

A plurality of deformable spacers 230 can be included in the sealant 220. Where more than one deformable spacer 230 is used, the deformable spacers 230 can all be substantially uniform in shape, or at least uniform in the first dimension 235, so the resulting seal 240 provides a uniform distance between the first and second components 210, 215. In some embodiments, the plurality of deformable spacers 230 comprises about 1% to about 50% by volume of the sealant 220 and the resulting seal 240. Embodiments can also include where the plurality of deformable spacers 230 comprises about 5% to about 20% by volume of the sealant 220 and the resulting seal 240.

Where the deformable spacer 230 comprises a resilient material, the method 200 can further comprise compressing the seal 240 between the first component 210 and the second component 215 to deform the deformable spacer 230. That is, the seal 240 and the deformable spacer 230 can be further compressed between the first and second components 210, 215 so that a distance between the first and second components 210, 215 is less than the first dimension 235; e.g., the reduced first dimension 250 as shown in FIG. 2D.

Where the deformable spacer 230 comprises a thermoplastic material, the method 200 can further comprise heating the deformable spacer 230 to soften the thermoplastic material. The seal 240 can then be compressed to deform the deformable spacer comprising the softened thermoplastic material. In this manner, the seal 240 and the deformable spacer 230 can be further compressed between the first and second components 210, 215 so that a distance between the first and second components 210, 215 is less than the first dimension 235; e.g., the reduced first dimension 250 as shown in FIG. 2D.

In embodiments where the seal 240 is further compressed to deform the deformable spacer 230, the first dimension 235 of the deformable spacer 230 can be reduced at least about 1%, about 5%, about 10%, about 15%, about 20%, about 25%, about 30%, about 35%, or about 40% or more compared to an uncompressed deformable spacer. Depending on the shape of the deformable spacer 230, the compression deforming the deformable spacer 230 can make the first dimension of the deformable spacer less than a second dimension perpendicular to the first dimension; e.g., a spherical deformable spacer 230 can be deformed where a circular cross-section becomes an oval cross-section. In some embodiments, the first dimension 235 of the deformable spacer 230 is reduced by about 20% to about 30% compared to an uncompressed deformable spacer. The compression that reduces the first dimension 235 of the deformable spacer 230 can be applied using a compression system or compression retention system as described herein. The compression can provide an effective sealing force between the first and second components 210, 215. For example, various embodiments include compressing the seal 240 to deform the deformable spacer 230 using about 0.075 N/mm$^2$ to about 0.75 N/mm$^2$ of pressure.

The method 200 can be conducted in various ways. For example, a robotic dispensing system can apply the sealant 220 to the first component 210 as would be done for making a form-in-place gasket. Use of a deformable spacer 230 in the gasket bead (e.g., sealant 220 in panel A of FIG. 2) controls the wet gasket thickness during fuel cell stack assembly. The deformable spacer 230 can enable a wet gasket thickness of approximately 1.0 mm, and then after the surrounding precursor material 225 is cured at 1.0 mm, the deformable 230 spacer can allow for a 20% to 30% compression in order to generate a sufficient sealing/counter force.

The precursor material 225 in the sealant 220 can comprise a flow-processable elastomer, such as, for example, a thermosetting liquid injection moldable compound including silicones, fluoroelastomers, fluorosilicones, natural rubber, and/or ethylene propylene diene monomer (EPDM) and polyisobutylene. Such materials can also be cured and used to make the deformable spacer 230. In some embodiments, the precursor material 225 includes a fluid polymeric, curable reaction system having components that form an elastomeric material when admixed and, in a thermal-addition curable embodiment, heated to a predefined cure temperature. Such a system can be adapted for use as a form-in-place gasket material for dispensing as a generally non-slumping or form-stable bead of a viscous admixture which is issued from a nozzle or other orifice onto the surface of an assembly component. Upon being heated to a predefined temperature or, alternatively, reaction with atmospheric moisture or exposure to ultraviolet (UV) radiation, the material may be cured in situ to form a resilient gasket which adheres to the component surface. The gasket so formed is capable of filling gaps between mating surfaces of various components for the environmental sealing thereof.

In a thermal addition curable embodiment, the reaction system can be formulated as a fluid admixture of: (a) a polymeric binder component, i.e., resin, having first functional groups; (b) a cross-linking component having second functional groups reactive with the first functional groups of the binder component; (c) a catalyst component effective to catalyze the reaction of the first and second functional groups; (d) one or more deformable spacers, and optionally (e) an electrically-conductive filler. By fluid, it is meant that the admixed composition exhibits representative fluid flow characteristics allowing it to be extruded under pressure through a dispensing nozzle, needle, or other orifice at a given flow velocity. For example, flow rates through a 0.5 to 2 mm orifice of between about 0.025-2.75 g/min at from about 275-400 kPa can be used. The uncured composition, moreover, is provided to be sufficiently viscous, e.g., 1,000-10,000 poise at 25 degrees C., such that it may be dispensed on a substrate as a generally continuous, form-stable bead and thereafter cured directly thereon under atmospheric pressure without the use of a mold. By form-stable, it is meant that the uncured bead of the composition which is applied to the substrate exhibits less than about 25% slump, sag, or running prior to the curing thereof to form a seal of elastomeric material.

The binder component and cross-linking component may react to form a cured elastomeric material via a thermal addition polymerization, i.e., a vulcanization or cross-linking mechanism, when admixed. By cured, it is meant that the binder of the composition is polymerized, cross-linked, further cross-linked or polymerized, vulcanized, cooled, hardened, or otherwise chemically or physically changed from a liquid or other fluent form into a solid elastomeric or polymeric phase. Thermal addition cure systems, which may be foamed or unfoamed, include those having a curing mechanism involving the direct cross-linking reaction of functional group species on adjacent molecules which also may be oligomers or polymers. The cross-linking reaction can be thermally accelerated and can have a cure profile which may include a predefined cure or critical temperature for a given heating time.

The curing reaction may occur between the same molecules or functional groups, and alternatively may be moisture or UV-catalyzed at ambient temperature. In various thermal-cure, silicone-based embodiments, the system incorporates an elastomeric, silicone-based binder component having a first functional species, such as vinyl groups, and a silicone-based cross-linking agent having a second functional species, such as hydride groups, different from the first functional species but which are reactive therewith. That is, the first and second species exhibit reactive affinity above a certain activation energy level such that a thermally-induced cross-linking reaction is effected at temperatures at or above a particular cure temperature resulting in the curing of the reaction system to form a form-stable elastomeric material. As used herein, the term elastomeric refers to its general meaning of exhibiting rubber-like properties of compliancy, resiliency, low compression set, flexibility, and an ability to recover after deformation, i.e., stress relaxation. As with silicone elastomers in general, the precursor material 225 can exhibit thermal and oxidation resistance over a wide temperature range, and well as resistance to many chemicals and to weather effects.

The precursor material 225 can include a binder and cross-linking component, each of which may have a respective weight average molecular weight of between about 70,000-

90,000, that may be classified as a silicone-based, thermal-addition curable or cross-linking elastomeric composition. In some embodiments, a linear vinyl-terminated siloxane polymer, such as vinyl-terminated polydimethyl siloxane, is used as the binder component, and at least a stoichiometric, molar amount of a hydride-terminated siloxane, siloxane polymer, or siloxane copolymer, is used as the cross-linking agent. In certain embodiments, the binder and cross-linking agent components are admixed in a one-part system. Alternatively, the binder component may be included in a first part of a two-part system, with the cross-linking agent component being included in a second part formulated to be mixed in a defined volumetric proportion with the first part. In either system, one or both parts additionally may include a carrier, such as a silicone or silicone-compatible fluid, a diluent such as toluene, alcohol, or other organic solvent, or additional binder component including the first functional group species. Useful silicone-based compositions include those marketed commercially by Dow Corning Corp., Midland, Mich. and General Electric Co., Silicone Products Div., Pittsfield, Mass.

Various inhibitors may optionally be included in the single part or in the second part of the two-part formulation for inhibiting the reaction at room temperature between the first and second functional group species and thereby increasing the pot-life or open-time of the mixture. At elevated curing temperatures of from about 85-150 degrees C., however, the inhibitor can be volatilized to thereby allow the cross-linking reaction between the first and second functional groups to proceed to cure. A metallic catalyst, such as an organometallic platinum catalyst, likewise may be included in the single part or in the first part of the two-part formulation to catalyze the thermal addition cross-linking reaction between the first and second functional groups. Generally, from about 5-10 ppm of such catalyst, based on the total weight of the functional siloxane components, is included with the first component.

Other polymeric materials suitable for use as the binder component include natural rubbers such as Hevea and thermoplastic, i.e., melt-processable, or thermosetting, i.e., vulcanizable, synthetic rubbers such as fluoropolymer, chlorosulfonate, polybutadiene, butyl, neoprene, nitrile, polyisoprene, buna-N, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. Synthetic rubbers also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides.

In some embodiments, the precursor material 225 can be electrically conductive where the silicone-based or other elastomeric binder component is rendered electrically conductive via its loading with an electrically conductive filler. Suitable electrically conductive fillers include nickel and nickel-plated substrates such as graphite, noble metal-based fillers, and particularly silver-based fillers such as: pure silver; silver-plated noble metals such as silver-plated gold; silver-plated non-noble metals such as silver-plated copper, nickel, aluminum, and tin; and silver-plated glass, ceramics, plastics, and mica; and mixtures thereof. The shape of the filler may include any shape that is generally involved in the manufacture or formulation of conductive materials of the type herein involved including solid spheres, hollow microspheres, flakes, platelets, fibers, rods, or irregularly-shaped particles. Similarly, the particle size of the filler is not considered limiting, but generally will be in the range of from about 0.250-250 micrometers, including a range of from about 0.250-75 micrometers.

A solvent or other diluent may be employed during the compounding of the formulation to lower the viscosity of the material for improved mixing and delivery. Other theological agents and additives, such as pigments, microwave-attenuating or thermally-conductive fillers, lubricants, wetting agents, stabilizers, antioxidants, coloring or opacifying agents, fire retardants, chain extending oils, tackifiers, blowing agents, foaming or anti-foaming agents, and the like, optionally may be incorporated into the formulation depending upon the requirements of the particular application envisioned.

Formulated as described, the admixed thermal addition reaction system of is essentially thermosetting following a prescribed cure schedule. Such a cure schedule involves the exposure of the composition to a cure temperature of between about 85-150 degrees C., for a period between about 30-60 minutes, or otherwise until a full cure is effected. For example, within the preferred temperature range and heating or cure times, compression sets at 50% deflection of about 30-50% may be achieved. The total thermal energy transferred is a function of both the cure temperature and the heating time, with cure time and temperature being inversely proportional. That is, the cure is thermally accelerated such that lower cure temperatures require longer heating times, with higher cure temperatures requiring shorter heating times. However, it will be understood that if a moisture, i.e., RTV, or UV-curable silicone binder system is substituted for the thermal addition system of the illustrated embodiment, then the heating step may be eliminated or replaced with the exposure of the material to UV radiation or ambient humidity.

The present technology provides several benefits and advantages. These include reducing gasket dispensing cycle times thereby reducing costs. For example, the present methods can be run in about half the time that cure-in-place methods would require for forming similar sealed assemblies. The deformable spacer controls the thickness of the gasketed area and allows use of the lower cost form-in-place sealing process while maintaining a defined distance between assembly components.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:
1. A sealed assembly comprising:
a first component;
a second component; and
a seal disposed between the first component and the second component, the seal comprising a first resilient material and a deformable spacer positioned within the first resilient material and initially spaced from the first component or the second component when the first component and the second component are not undergoing compression, wherein the deformable spacer is deformable in response to a compressive force applied to the first component and the second component, the seal compressible between the first component and the second component until the deformable spacer contacts the first component and the second component;

wherein the deformable spacer is formed from a same material as the first resilient material.

2. The sealed assembly of claim 1, wherein a first dimension of the deformable spacer defines a distance between the first component and the second component when the deformable spacer is contacting each of the first component and the second component and the deformable spacer is not yet undergoing the compressive force applied to the first component and the second component.

3. The sealed assembly of claim 2, wherein the deformable spacer is deformed from the first dimension to a smaller second dimension when the deformable spacer is deformed by the compressive force applied to the deformable spacer by the first component and the second component.

4. The sealed assembly of claim 3, wherein a third dimension of the deformable spacer extends in a direction perpendicular to the first dimension and the second dimension and the third dimension is increased when the deformable spacer is deformed from the first dimension to the second dimension.

5. The sealed assembly of claim 4, wherein the third dimension of the deformable spacer is greater than the second dimension of the deformable spacer when the deformable spacer is deformed from the first dimension to the second dimension.

6. A sealed assembly comprising:
a first component;
a second component; and
a seal disposed between the first component and the second component, the seal comprising a first resilient material and a deformable spacer positioned within the first resilient material and initially spaced from the first component or the second component when the first component and the second component are not undergoing compression, wherein the deformable spacer is deformable in response to a compressive force applied to the first component and the second component, the first resilient material of the seal compressible between the first component and the second component until the deformable spacer contacts the first component and the second component and a dimension of the deformable spacer defines a distance between the first component and the second component;

wherein a compression system compresses the seal between the first component and the second component and deforms the deformable spacer.

7. The sealed assembly of claim 6, wherein the compression system compresses and deforms the seal in a direction extending between the first component and the second component.

8. The sealed assembly of claim 1, wherein the first resilient material is formed by curing a precursor material disposed between and extending from the first component to the second component.

9. The sealed assembly of claim 8, wherein a compressing of the seal between the first component and the second component causes both the deformable spacer and the first resilient material to apply a sealing force to the first component and the second component in response to the compressing of the seal.

10. The sealed assembly of claim 6, wherein the deformable spacer is formed from a second resilient material different from the first resilient material.

11. The sealed assembly of claim 1, wherein the deformable spacer is formed from a silicone elastomer.

12. The sealed assembly of claim 1, wherein the deformable spacer is formed from a thermoplastic material.

13. The sealed assembly of claim 12, wherein the thermoplastic material comprises polyethylene.

14. The sealed assembly of claim 1, wherein a heating of the deformable spacer causes the deformable spacer to soften.

15. The sealed assembly of claim 1, wherein the seal comprises a plurality of the deformable spacers.

16. A fuel cell assembly comprising the sealed assembly of claim 1, wherein the first component comprises a member selected from a first group consisting of an end plate, a bipolar plate, and a membrane electrode assembly and the second component comprises a member selected from a second group consisting of an end plate and a bipolar plate.

17. A fuel cell stack comprising a plurality of the fuel cell assemblies of claim 16.

18. A sealed assembly comprising:
a first component;
a second component; and
a seal disposed between the first component and the second component, the seal comprising a first resilient material and a deformable spacer formed from one of a silicone elastomer and a thermoplastic material, wherein the deformable spacer is deformable in response to a compressive force applied thereto by the first component and the second component,
wherein the deformable spacer comprises a plurality of deformable spacers dispersed within the first resilient material, all of the deformable spacers substantially uniform in shape and individually comprising about 5% to about 20% by volume of the seal.

* * * * *